E. HEYDON.
TROLLEY SPLICE.
APPLICATION FILED APR. 20, 1912.
1,036,112.
Patented Aug. 20, 1912.
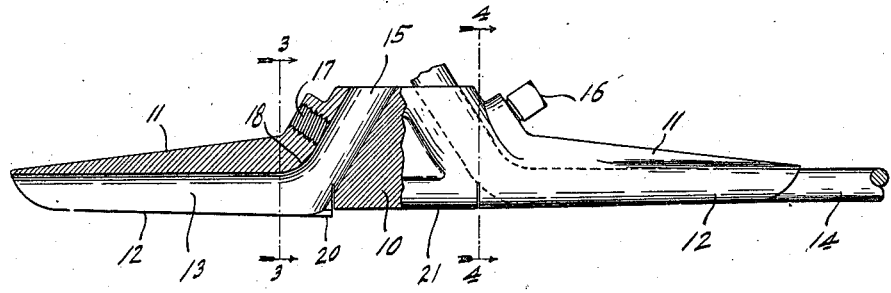
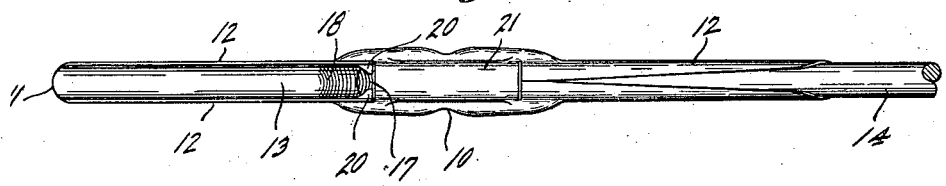
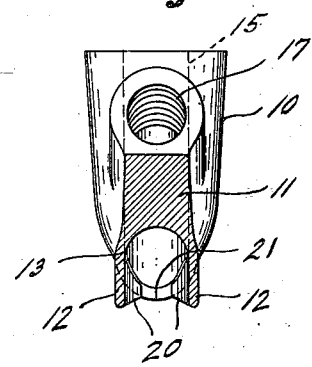
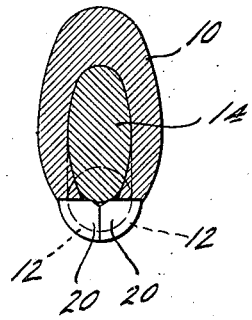
Witnesses
Frank A. Fahle
May Layden
Inventor
Edward Heydon,
By Arthur M. Hood
Attorney

UNITED STATES PATENT OFFICE.

EDWARD HEYDON, OF INDIANAPOLIS, INDIANA.

TROLLEY-SPLICE.

1,036,112.

Specification of Letters Patent. Patented Aug. 20, 1912.

Application filed April 20, 1912. Serial No. 692,081.

*To all whom it may concern:*

Be it known that I, EDWARD HEYDON, a citizen of the United States, residing at Indianapolis, in the county of Marion and State of Indiana, have invented a new and useful Trolley-Splice, of which the following is a specification.

It is necessary in splicing trolley wires that the trolley-engaging surface of the wire and of the splice be as nearly smooth as possible, as any unevenness causes a pounding as the trolley wheel or collector passes, and the pounding, by crystallizing the metal, eventually causes a fracture. Moreover, the smooth under surface of the trolley wire and splice should remain smooth, and not become distorted by the passing of the trolley wheels or collector. While numbers of trolley splices have been provided, and some of them have initially presented a fairly smooth under surface, it is my experience that even these in a short time become uneven at certain points. The weakest point, and the one where the main unevenness occurs, is where the wire turns up through the splice.

It is the object of my invention to improve the structure of trolley splices and especially to strengthen this weak point.

The novel features of my invention will appear from the descriptions and drawings, and will be particularly pointed out in the claims.

In the drawings, Figure 1 is a side elevation, partly in longitudinal section, of a trolley splice embodying my invention; Fig. 2 is a bottom view of such splice; and Figs. 3 and 4 are sections respectively, on the lines 3—3 and 4—4 of Fig. 1.

From the central part 10 of my improved trolley splice project oppositely extending arms 11, which gradually diminish in cross section as they recede from the central part. From each side of each arm 11 depends a longitudinal flange 12 forming a longitudinal groove 13 of proper shape to receive a trolley wire 14. At the inner end of each arm 11 the groove 13 opens into a hole 15 extending obliquely upward through the central part 10 and of proper size and shape to fit the wire 14, the wire being held in place in the hole by a clamping screw 16 engaging a threaded hole 17 transverse to the hole 15. The upper face of the groove 13 is rounded at 18 where it turns from the horizontal into the oblique hole 15, so as to prevent the trolley wire from being weakened by a sharp bend. The trolley wire 14 fits around the curved surface 18, its lower side leaving an open space between the line of the bottom of the trolley wire before it is bent upward and the center portion 10. It is this open space which has caused most of the trouble in trolley splices heretofore used, for it is necessary to fill it substantially completely in order to avoid pounding and the consequent crystallization of the trolley wire. If this open space is not filled completely, the partial filling will be forced upward by passing trolley-wheels or collectors, thus creating a surface hollow which produces the pounding which eventually results in the breaking of the wire. To fill this open space, I provide each flange 12 at its end toward the middle portion 10 with a lug 20 which extends toward a similar lug on the coöperating flange 12. The surfaces of these two lugs toward the trolley wire are initially cylindrical surfaces substantially in line with the corresponding parts of the surface of the oblique holes 15, thus allowing the insertion of the bent portion of the trolley wire with ease. After the trolley wire is in place, the flanges 12 are crimped over the wire as indicated in the right hand parts of Figs. 1 and 2 and Fig. 4. By this crimping process the lugs 20 are forced into the position shown in Fig. 4, effectually filling the open space at the under curved part of the trolley wire. The flanges 12 at the lugs 20 are bent to form substantially a semi-cylindrical surface, as indicated in Fig. 4, and this semi-cylindrical surface is in alinement with the permanent semi-cylindrical surface 21 at the bottom of the central portion 10. Thus any pounding at the bends of the trolley wire is prevented. These semi-cylindrical surfaces are maintained permanently in alinement because the lugs 20 bear firmly against the surfaces of the trolley wire.

To aid in the smoothness of the lower surface of the splice, the flanges 12 are preferably tapered slightly, depending farthest at the ends toward the middle portion 10, and then being just long enough to meet the coöperating flanges when cramped around the trolley wire. In consequence, the flanges when bent over the trolley wire will have an approximately V-shape groove between them, as indicated in the right hand part of Fig. 2. This groove causes the traveling trolley beneath the wire to pass without pounding from the wire to the splice proper, sliding gradually along the edges of the flanges 12 to the semi-cylindrical lower part of the middle portion 10 and thence along the edges of the flanges 12 of the other arm 11 to the wire 14 beyond.

What I claim as new is:

1. A trolley splice comprising a middle portion and two oppositely projecting arms, each of said arms being provided with a pair of depending longitudinal flanges to form a wire-receiving groove and the middle portion being provided with an opening which leads into each of said grooves, said flanges being tapered and depending farthest at their ends toward the middle portion and there depending sufficiently so that they meet when crimped around the trolley wire.

2. A trolley splice comprising a middle portion and two oppositely projecting arms, each of said arms being provided with a pair of depending longitudinal flanges to form a wire-receiving groove and the middle portion being provided with an opening which leads into each of said grooves, said flanges being tapered and depending farthest at their ends toward the middle portion.

3. A trolley splice comprising a middle portion and two oppositely projecting arms, each of said arms being provided with a pair of longitudinal depending flanges to form a wire-receiving groove and the middle portion being provided with an opening leading at an angle into each of said grooves, and each of said flanges being provided at its end toward the middle portion with an inwardly projecting lug which when the flange is crimped around the trolley wire fits into the space formed by the curve of the trolley wire as it passes from the groove to the opening in the middle portion.

4. A trolley splice comprising a middle portion and two oppositely projecting arms, each of said arms being provided with a pair of longitudinal depending flanges to form a wire-receiving groove and the middle portion being provided with an opening leading at an angle into each of said grooves, and each of said flanges being provided at its end toward the middle portion with an inwardly projecting lug which when the flange is crimped around the trolley wire fits against the curved portion of the trolley wire where it passes from said groove into said opening, and, supports the crimped flanges so that their trolley-engaging surfaces are in substantially smooth alinement with the trolley-engaging surface of the middle portion.

5. A trolley splice comprising a middle portion and two oppositely projecting arms, each of said arms being provided with a pair of longitudinal depending flanges to form a wire-receiving groove and the middle portion being provided with an opening leading at an angle into each of said grooves, and each of said flanges being provided at its end toward the middle portion with an inwardly projecting lug, the inner surfaces of said lugs being curved and in substantial alinement with the sides of the corresponding openings in the middle portion before the flanges are crimped around the trolley wire.

6. A trolley splice comprising a middle portion and two oppositely projecting arms, each of said arms being provided with a pair of longitudinal depending flanges to form a wire-receiving groove and the middle portion being provided with an opening leading at an angle into each of said grooves, and each of said flanges being provided at its end toward the middle portion with an inwardly projecting lug.

In witness whereof I have hereunto set my hand and seal at Indianapolis, Indiana, this eighteenth day of April, A. D. one thousand nine hundred and twelve.

EDWARD HEYDON. [L. S.]

Witnesses:
G. B. SCHLEY,
JOSEPHINE GASPER.